(12) United States Patent
Ziech

(10) Patent No.: US 11,926,206 B2
(45) Date of Patent: Mar. 12, 2024

(54) HYBRID ELECTRIC VEHICLE AXLE WITH TWO MOTORS

(71) Applicant: Dana Heavy Vehicle Systems Group, LLC, Maumee, OH (US)

(72) Inventor: James F. Ziech, Kalamazoo, MI (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 478 days.

(21) Appl. No.: 17/338,541

(22) Filed: Jun. 3, 2021

(65) Prior Publication Data
US 2021/0291635 A1 Sep. 23, 2021

Related U.S. Application Data

(63) Continuation of application No. 16/468,751, filed as application No. PCT/US2017/065720 on Dec. 12, 2017, now Pat. No. 11,065,949.
(Continued)

(51) Int. Cl.
*B60K 1/02* (2006.01)
*B60B 35/12* (2006.01)
(Continued)

(52) U.S. Cl.
CPC .............. *B60K 1/02* (2013.01); *B60B 35/122* (2013.01); *B60B 35/14* (2013.01); *B60B 35/16* (2013.01);
(Continued)

(58) Field of Classification Search
CPC ... B60K 1/02; B60K 6/26; B60K 6/36; B60K 17/165; B60B 35/122; B60B 35/14;
(Continued)

(56) References Cited

U.S. PATENT DOCUMENTS 1,251,749 A * 1/1918 Name not available ............... B60K 17/046
180/65.6
1,810,834 A * 6/1931 Klein ................. B61C 9/50
295/39

(Continued)

FOREIGN PATENT DOCUMENTS

| DE | 202004016348 U1 | 12/2004 |
|---|---|---|
| EP | 2712066 A2 | 3/2014 |
| WO | 03064198 A1 | 8/2003 |

OTHER PUBLICATIONS

ISA European Patent Office, International Search Report and Written Opinion Issued in Application No. PCT/US2017/065720, dated Mar. 20, 2018, WIPO, 14 pages.

*Primary Examiner* — Jacob B Meyer
(74) *Attorney, Agent, or Firm* — McCoy Russell LLP

(57) ABSTRACT

Provided herein is an electric axle assembly including a first motor-generator assembly, a second motor generator assembly, an axle housing, a first axle half shaft drivingly connected to the first motor-generator assembly and a second axle half shaft drivingly connected to the second motor-generator assembly. The first and second motor-generator assemblies each include a motor-generator and a housing and gear carrier portion. The axle housing includes a first axle tube portion, a second axle tube portion, a center portion, and an opening extending through the center portion of the axle housing, wherein the first axle tube portion and the second axle tube portion are disposed on axial opposite sides of the central portion. The first and second half shafts extended into the opening of the axle housing, and the first motor-generator assembly and the second motor-generator assembly are connected to the axle housing assembly.

19 Claims, 2 Drawing Sheets

Related U.S. Application Data

(60) Provisional application No. 62/434,114, filed on Dec. 14, 2016.

(51) Int. Cl.
*B60B 35/14* (2006.01)
*B60B 35/16* (2006.01)
*B60K 6/26* (2007.10)
*B60K 6/36* (2007.10)
*B60K 17/16* (2006.01)
*B60G 9/00* (2006.01)

(52) U.S. Cl.
CPC .............. *B60K 6/26* (2013.01); *B60K 6/36* (2013.01); *B60K 17/165* (2013.01); *B60G 9/00* (2013.01); *B60Y 2200/91* (2013.01); *B60Y 2200/92* (2013.01)

(58) Field of Classification Search
CPC ....... B60B 35/16; B60G 9/00; B60Y 2200/91; B60Y 2200/92
See application file for complete search history.

(56) References Cited

U.S. PATENT DOCUMENTS

| | | | |
|---|---|---|---|
| 1,906,930 A | 5/1933 | Ledwinka | |
| 4,270,622 A | 6/1981 | Travis | |
| 5,120,282 A * | 6/1992 | Fjallstrom | B60K 6/365 903/910 |
| 5,172,784 A * | 12/1992 | Varela, Jr. | B60L 50/62 180/65.265 |
| 5,419,406 A * | 5/1995 | Kawamoto | B60K 1/02 475/5 |
| 5,443,130 A * | 8/1995 | Tanaka | H02K 7/116 180/65.6 |
| 5,927,417 A * | 7/1999 | Brunner | B60K 6/46 180/374 |
| 6,615,946 B2 * | 9/2003 | Pasquini | B60K 17/344 180/65.6 |
| 6,727,620 B2 * | 4/2004 | White | H02K 16/00 310/112 |
| 6,978,853 B2 * | 12/2005 | Bennett | B60K 6/46 180/297 |
| 7,112,155 B2 * | 9/2006 | Keith | B60K 7/0007 475/6 |
| 7,314,105 B2 * | 1/2008 | Varela | B60K 7/0007 180/242 |
| 7,363,995 B2 * | 4/2008 | Downs | B60K 7/0007 180/65.6 |
| 7,935,014 B2 * | 5/2011 | Bachmann | B60L 15/2054 475/5 |
| 8,544,579 B2 * | 10/2013 | Kabrick | B60K 7/0007 180/65.51 |
| 8,640,800 B2 * | 2/2014 | Armbruster | B60K 7/0007 180/65.6 |
| 8,640,801 B2 * | 2/2014 | Hennings | B60K 7/0007 180/65.6 |
| 9,630,482 B2 * | 4/2017 | Raymond | B60K 1/02 |
| 9,764,644 B2 * | 9/2017 | Nishida | B60L 3/00 |
| 9,873,455 B2 * | 1/2018 | Buschjohann | B60K 7/0007 |
| 10,436,306 B2 * | 10/2019 | Bassis | F16H 57/028 |
| 10,518,627 B2 * | 12/2019 | Nagpal | B62D 21/11 |
| 2001/0011611 A1 * | 8/2001 | Poerschmann | B60K 1/02 180/65.1 |
| 2003/0067234 A1 * | 4/2003 | White | H02K 16/00 310/112 |
| 2006/0054368 A1 * | 3/2006 | Varela | B60K 7/0007 180/65.51 |
| 2008/0179116 A1 * | 7/2008 | Ikenoya | B60K 17/356 180/63 |
| 2009/0014223 A1 * | 1/2009 | Jones | B60K 17/16 903/903 |
| 2010/0108417 A1 * | 5/2010 | Gilmore | B60K 6/52 477/3 |
| 2011/0094807 A1 * | 4/2011 | Pruitt | B60L 50/40 180/65.6 |
| 2011/0209934 A1 * | 9/2011 | Armbruster | B60K 7/0007 180/65.6 |
| 2012/0052995 A1 * | 3/2012 | Scarbo | B60K 7/0007 903/903 |
| 2012/0103708 A1 * | 5/2012 | Hennings | B60K 7/0007 180/65.6 |
| 2019/0315216 A1 * | 10/2019 | Ziech | B60K 17/165 |
| 2020/0031224 A1 * | 1/2020 | Perry | B60K 17/046 |
| 2020/0122572 A1 * | 4/2020 | Kumar | B60K 1/02 |

* cited by examiner

HYBRID ELECTRIC VEHICLE AXLE WITH TWO MOTORS

CROSS-REFERENCE TO RELATED APPLICATIONS

The present application is a continuation of U.S. patent application Ser. No. 16/468,751, entitled "HYBRID ELECTRIC VEHICLE AXLE WITH TWO MOTORS," and filed on Jun. 12, 2019. U.S. patent application Ser. No. 16/468,751 is a national phase of International Patent Application No. PCT/US2017/065720, entitled "HYBRID ELECTRIC VEHICLE AXLE WITH TWO MOTORS," and filed on Dec. 12, 2017. International Patent Application Serial No. PCT/US2017/065720 claims priority to U.S. Provisional Patent Application Ser. No. 62/434,114, entitled "HYBRID ELECTRIC VEHICLE AXLE WITH TWO MOTORS," and filed on Dec. 14, 2016. The entire contents of each of the above-listed applications are hereby incorporated by reference for all purposes.

BACKGROUND

There is an increasing interest in hybrid and pure electric vehicles due to urban air pollution and greenhouse gas carbon emission regulations. One type of vehicle hybridization technology used is a parallel hybrid system where one axle is combustion engine powered and another axle is powered by one or more electric axle motors. Another type of system is purely electric drive that does not utilize an internal combustion engine for powering the driveline.

Current technology electrified vehicle axles have offered a limited ability to incorporate dynamic torque vectoring, where an amount of torque delivered to each wheel is varied. In electrified vehicle axles without a wheel differential, dynamic torque vectoring has been performed by using two motors, wherein motors and a multi-stage helical gear or planetary drive are used for each wheel. Alternately, a single motor can be used with a dual friction clutch and helical gear or planetary drives one for wheel. Optionally, the single motor system is combined with mechanical propulsion from an internal combustion engine in a single rear drive unit and a shift system to incorporate a part time torque vectoring capability. Such systems, however, are bulky, hard to package, costly and inefficient.

It would be advantageous to develop an electric axle which can operate efficiently in a small package and utilize currently tooled high volume components.

SUMMARY

Provided herein is an electric axle assembly including a first motor-generator assembly, a second motor generator assembly, an axle housing, a first axle half shaft drivingly connected to the first motor-generator assembly and a second axle half shaft drivingly connected to the second motor-generator assembly. The first motor-generator assembly includes a motor-generator and a housing and gear carrier portion. The second motor-generator assembly includes a motor-generator and a housing and gear carrier portion. The axle housing includes a first axle tube portion, a second axle tube portion, a center portion, and an opening extending through the center portion of the axle housing, wherein the first axle tube portion and the second axle tube portion are disposed on axial opposite sides of the central portion. The first axle half shaft drivingly connected the first motor-generator assembly at a first axial end thereof and drivingly connected to a first wheel assembly at a second axial end thereof. The second axle haft shaft drivingly connected to the second motor-generator assembly at a first axial end thereof and drivingly connected to a second wheel assembly at second axial end thereof. The second axial ends of the first and second half shafts extended into the opening of the axle housing, and the first motor-generator assembly and the second motor-generator assembly are connected to the axle housing assembly.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

Novel features, as well as other advantages of the present invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts of the present invention. Hence, specific dimensions, directions, orientations or other physical characteristics relating to the embodiments disclosed are not to be considered as limiting, unless expressly stated otherwise.

Figure 1:
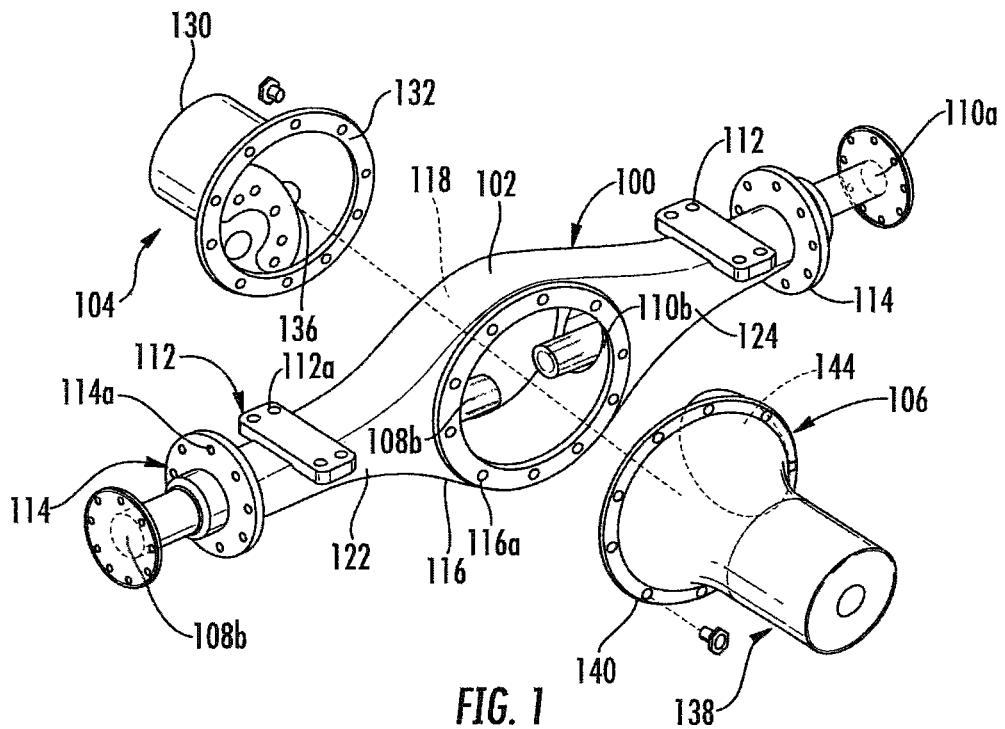
FIG. 1 is a partially exploded, perspective view of one preferred embodiment of an electric axle.

FIG. 1 depicts an electric axle assembly 100 for a motor vehicle according to one preferred embodiment. The electric axle assembly 100 includes an axle housing 102, a first motor assembly 104, and a second motor assembly 106, but is understood that the axle assembly 100 may include additional assemblies. In some embodiments, the first motor assembly 104 and the second motor assembly 106 are parallel to each other.

The first motor assembly 104 is coupled to the axle housing 102 and is in driving engagement with a first axle half shaft 108. In some embodiments, the first axle half shaft 108 is at least partially disposed in the axle housing 102. The second motor assembly 106 is coupled to the axle housing 102 and is in driving engagement with a second axle half shaft 110. In some embodiments, the second axle haft shaft 110 is at least partially disposed in the axle housing 102.

In some embodiments, the first motor assembly 104 and the second motor assembly 106 are directly coupled to the axle housing 102, each assembly driving the axle half shaft 108, 110 respectively. In some embodiments, the first motor assembly 104 and second motor assembly 106 are integral with the axle housing 102.

In some embodiments, the axle housing 102 is a hollow elongate member that at least partially encloses elements of the axle including axle half shafts 108, 110 of the motor vehicle. In some embodiments, the axle housing 102 is a high volume "banjo" type axle housing. The "banjo" type axle housing allows for installation of the axle assembly 100 in a motor vehicle chassis with the use of existing suspension or service brake components, however, it is understood that other styles of axle housings may be used.

In some embodiments, the axle housing 102 is a "banjo" style housing including a beam 120 having a first axle tube portion 122 and a second axle tube portion 124 and a central portion 116. The axle housing 102 can be formed by any conventional methods. In some embodiments, the axle housing 102 is formed of a stamped metal material and the shape thereof is refined using secondary operations, such as machining or welding attachments thereto. The axle tube portions 122, 124 are disposed on opposite lateral sides of the central portion 116.

As shown in FIG. 1, in some embodiments, the axle housing 102 includes suspension mounting members or brackets 112 and brake mounting members or brackets 114. In some embodiments, the axle assembly 100 includes two sets of suspension mounting brackets 112 positioned on an outer surface 122a, 124a of the axle tube portions 122, 124. In some embodiments, the brackets 112 include mounting apertures 112a that permit a fastener, such as a U-bolt (not shown) to be positioned through the bracket 112 to facilitate the coupling of a spring or other suspension component to the bracket 112. The suspension mounting bracket 112 can be fixedly coupled to the axle housing 102 by any appropriate means, such as, welding.

In some embodiments, the brake mounting members 114 are mounted to the outer surface 122a, 124a of the axle tube portions 122, 124, axially away from the center portion 116. The brake mounting members 114 can be configured a conventional manner to mount a brake system (not shown), such as a brake caliper (not shown) and can be fixedly coupled to the axle housing 102 by any appropriate means, such as welding.

The center portion 116 of the axle housing 102 includes an opening 118 extending through the axle housing 102. In some embodiments, the center portion 116 is generally cylindrical in shape connecting the axle tube portion 122, 124 and defines the opening 118. In some embodiments, the center portion 116 may include a plurality of apertures 116a are formed in the outer surface of the center portion 116 adjacent to the opening 118. The apertures 116a allow for attaching the center portion 116 to the first motor assembly 104 and the second motor assembly 106 to the axle housing 102. Such an attachment is typically performed by threaded fasteners including, but not limited to, bolts.

The first axle half shaft 108 is rotatably disposed in the first axle tube portion 122 of the axle housing 102. The first axle half shaft 108 has a first axial end 108a and a second axial end 108b. At least a portion of the first axle half shaft 108 including the first axial end 108 extends outside of the first axle tube portion 122 and is attached to a wheel hub configured for mounting a wheel assembly (not shown) thereto. The wheel assembly includes a wheel powered by the axle assembly 100. In some embodiments, the first axle tube portion 122 is configured to contain bearings (not shown) on which the first axle half shaft 108 rotates. In some embodiments, the second axial end 108b of the first axle half shaft 108 extends through the center portion 116. The second axial end 108b can be a splined end that extends out of the center portion 116 is positioned within the opening 118 of the axle housing 102. The splined end 126 is drivingly engaged with a portion of the first motor assembly 104.

The second axle half shaft 110 is rotatably disposed in the second axle tube portion 124 of the axle housing 102. The second axle half shaft 110 has a first axial end 110a and a second axial end 110b. The first axial end 100a of the second axle half shaft 110 extends outside of the second axle tube portion 124 and is attached to a wheel hub configured for mounting a wheel assembly (not shown) thereto. The wheel assembly includes a wheel powered by the axle assembly 100. In some embodiments, the second axle tube portion 124 is configured to hold bearings (not shown) on which the second axle half shaft 110 rotates. In some embodiments, the second axial end 110b extends through the second axle tube 122 and the center portion 116. The second axial end 110b is a splined end and is positioned within the opening 118 of the axle housing 102. The splined end 110b is drivingly engaged with a portion of the second motor assembly 106.

In some embodiments, the first motor assembly 104 includes a first motor-generator 130, a housing and gear carrier portion 132, a motor-generator output gear 134, and a drive gear 136. In some embodiments, the housing and gear carrier portion 132 houses the output gear 134 and the drive gear 136.

The first motor assembly 104 is coupled to the axle housing 102 such that the first motor assembly 104 in driving engagement with the first axle half shaft 108. In some embodiments, the first motor-generator 130 is coupled to the housing and gear carrier portion 132 and is in driving engagement with the motor-generator output gear 134. The motor-generator output gear 134 is in driving engagement with a rotor (not shown) of the first motor-generator 130. In some embodiments, the rotor is perpendicular to the output gear 134. The first motor-generator 130 is in electrical communication with a controller (not shown) and a battery (not shown).

In some embodiments, the first motor-generator 130 is mounted to the housing and gear carrier portion 132. In some embodiments, the first motor-generator 130 is positioned perpendicular to the first and second axle tube portions 122, 124. In some embodiments, the first-motor generator 130 is positioned within the housing and gear carrier portion 132.

In some embodiments, the drive gear 136 is rotatably mounted directly to the housing and gear carrier portion 132 through bearings (not shown). In some embodiments, the drive gear 136 and the output gear 134 are positioned at least partially within the opening 118 of the axle housing 102.

In some embodiments, the housing and gear carrier portion 132 is directly coupled to the axle housing 102. As depicted in FIG. 1, the housing and gear carrier portion 132 may include a plurality of apertures 132a which align with the plurality of apertures 116a in the central portion 116 to allow for direct connection of the housing and gear carrier portion 132 to the axle housing 102. This additional allows for quick and easy access to the motor-generators 130, 138 in the event that service is required to axle without having to disassembly the axle assembly 100. In some embodiments, a portion of the housing and gear carrier portion 132 is formed from a stamped metal and is coupled thereto in any conventional manner, such as by welding or through the use of fasteners.

Figure 2:
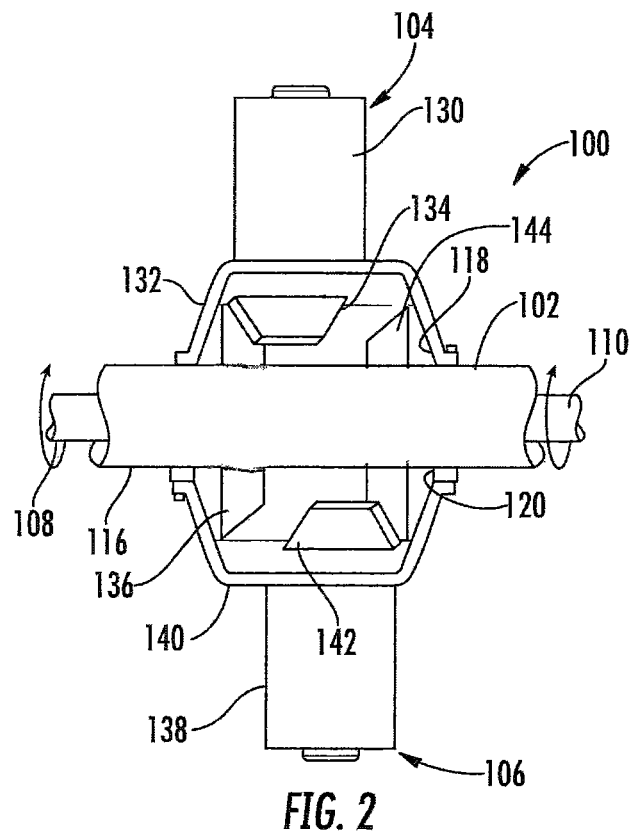
FIG. 2 is a partial, top-plan view of the electric axle shown in FIG. 1.
Figure 3:
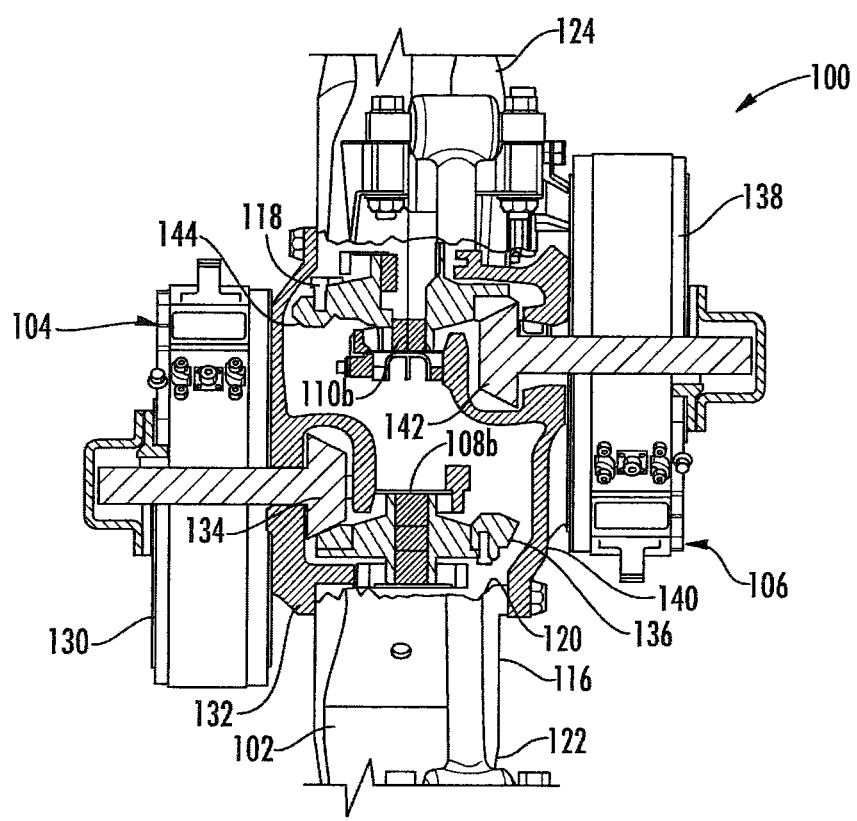
FIG. 3 is a partial, cross-sectional view of the electric axle shown in FIG. 1.

As shown in FIGS. 2-3, the motor-generator output gear 134 engages the drive gear 136 while also allowing engag-ing the splined end 108b of the first axle half shaft 108. In some embodiments, the housing and gear carrier portion 132 hold bearings (shown in FIG. 3) that facilitate rotation of the motor-generator output gear 134 and the drive gear 136.

In some embodiments, the motor-generator output gear 134 and the drive gear 136 are spiral bevel gears drivingly engaged with one another. The gears 134, 136 transfer power to and from the first axle half shaft 108 and the first motor-generator 130. In some embodiments, the gears 134, 136 provide a reducing drive ratio therebetween. Specifically, in some embodiments, the gears 134, 136 are a high numerical reduction spiral bevel gear set of about 7.0:1 is used to improve efficiency and allow the first motor-generator 130 to be down sized.

As shown in FIGS. 1-3, in some embodiments, the motor-generator output gear 134 and the drive gear 136 are configured perpendicular to one another, however, it is understood that the motor-generator output gear 134 and the drive gear 136 may be configured at other angles or be other types of gears. In further embodiments, the first motor assembly 104 can include additional reducing gear sets to achieve a desired gear reduction depending on the application the axle assembly 100 is used.

In some embodiments, the second motor assembly 106 is coupled to the axle housing 102 and is in driving engagement with a second axle half shaft 110. The second motor assembly 106 includes a second motor-generator 138, a housing and gear carrier portion 140, a motor-generator output gear 142, and a drive gear 144. In some embodiments, the housing and gear carrier portion 140 houses the output gear 142 and the drive gear 144.

In some embodiments, the second motor-generator 138 is coupled to the housing and gear carrier portion 140 and is in driving engagement with the motor-generator output gear 142.

In some embodiments, the second motor-generator 138 is coupled to the housing and gear carrier portion 140 and is in driving engagement with the motor-generator output gear 142. The motor-generator output gear 142 is in driving engagement with a rotor (not shown) of the second motor-generator 138. In some embodiments, the rotor is perpendicular to the output gear 142.

In some embodiments, the second motor-generator 138 is mounted to the housing and gear carrier portion 140. In some embodiments, the second motor-generator 138 is positioned perpendicular to the first and second axle tube portions 122, 124. In some embodiments, the second motor-generator 138 is positioned within the housing and gear carrier portion 140. In some embodiments, the drive gear 144 is rotatably mounted directly to the housing and gear carrier portion 140 through bearings (not shown). In some embodiments, the drive gear 144 and the output gear 142 are positioned at least partially within the opening 118 of the axle housing 102.

In some embodiments, the housing and gear carrier portion 140 is directly coupled to the axle housing 102. As depicted in FIG. 1, the housing and gear carrier portion 140 may include a plurality of apertures 140a which align with the plurality of apertures 116a in the central portion 116 to allow for direct connection of the housing and gear carrier portion 140 to the axle housing 102. In some embodiments, a portion of the housing and gear carrier portion 140 is formed from a stamped metal and is coupled thereto in any conventional manner, such as by welding or through the use of fasteners.

As shown in FIGS. 1-3, the motor-generator output gear 142 engages the drive gear 144 while also allowing engag-ing the splined end 110b of the second axle half shaft 110. In some embodiments, the housing and gear carrier portion 140 hold bearings (shown in FIG. 3) that facilitate rotation of the motor-generator output gear 142 and the drive gear 144.

In some embodiments, the motor-generator output gear 142 and the drive gear 144 are spiral bevel gears drivingly engaged with one another. The gears 142, 144 transfer power to and from the second axle half shaft 110 and the second motor-generator 138. In some embodiments, the gears 142, 144 provide a reducing drive ratio therebetween. Specifically, in some embodiments, the gears 142, 144 are a high numerical reduction spiral bevel gear set of about 7.0:1 to improve efficiency and allow the second motor-generator 138 to be down sized. In further embodiments, the second motor assembly 106 can include additional reducing gear sets to achieve a desired gear reduction depending on the application the axle assembly 100 is used.

As shown in FIGS. 1-3, in some embodiments, the motor-generator output gear 142 and the drive gear 144 are configured perpendicular to one another, however, it is understood that the motor-generator output gear 142 and the drive gear 144 may be configured at other angles or be other types of gears. In further embodiments, the second motor assembly 106 can include additional reducing gear sets to achieve a desired gear reduction depending on the application the axle assembly 100 is used.

The housing and gear carrier portion 140 facilitates a mounting of the second motor-generator 138 and the drive gear 144 while also providing mounting points for the second motor assembly 106 to be coupled to the axle housing 102. This additional allows for quick and easy access to the motor-generator 138 in the event that service is required to axle without having to disassembly the axle assembly 100. In some embodiments, a portion of the housing and gear carrier portion 140 may be formed from a stamped metal and carriers for the motor-generator output gear 142 and the drive gear 144 may be coupled thereto in any conventional manner, such as by welding or through the use of fasteners.

The motor-generators 130,138 are in electrical communication with a controller (not shown) and an energy storage device (not shown). In some embodiments, the energy storage device can be a battery. It is to be understood that the battery can be replaced with a fuel cell for a fuel cell electric vehicle drivetrain (FCEV). Depending on the electrical control of the motor-generator 130, 138 using the controller, the motor-generator 130, 138 may apply force to or retard a portion of the axle half shaft 108, 110 it is drivingly engaged with.

In some embodiments, the controller is configured to receive signals from a plurality of sensors (not shown) positioned on or off the axle assembly 100. The sensors provide signals indicative of various parameters of the axle assembly 100 including, but not limited to, steering wheel angle, angular acceleration, vehicle lateral acceleration, wheel speed, vehicle speed, throttle position sensor values, gear selector position, user selectable mode configurations, and the like, or some combination thereof. The electronic controller also receives one or more control inputs. The electronic controller by sending and receiving signals to motor-generators 130, 138 provides the ability to incorporate torque vectoring and a limited slip traction using the appropriate electronic algorithm. In some embodiments, the controller can send signals to control the torque and speeds of each motor-generator to apply a vehicle yaw moment to aid in the vehicle turn in or cornering. Alternately, controller can monitor the left and right wheel speeds and torques to determine if a low friction or split traction event requires left to right wheel torque or speed control and then send the required signals to the motor-generators 130, 138. In some embodiments, the controller provides the electric axle assembly 100 a fail safe operation in the event that a either the first motor-generator 130 or the second motor-generator 138 becomes inoperable.

In some embodiments, the motor-generators 130, 138 additionally provide electrical energy during regenerative braking. When the motor-generator 130, 138 retards portions of the electric axle 102, electric energy is generated within the motor-generator 130, 138. The electrical energy provided during regenerative braking can be utilized to charge a battery (not shown) connected to the motor-generator 130, 138 through a controller (not shown).

The electric axle assembly 100 as depicted eliminates the need for a differential, thus saving weight, however, it is within the scope of the invention for the electric axle assembly 100 to be adapted for use with a differential, thus allowing the blending of torque from two motors.

The electric axle assembly 100 can be used in front wheel drive and rear wheel drive vehicles. While not shown, it is understood that the electric axle assembly 100 may be operated with an unpowered tag or pusher axle to form a multi-axle driveline.

The electric axle assembly 100 disclosed herein are applicable to HEV, EV and Fuel Cell Hybrid systems. It should be understood that electric or hybrid electric vehicles incorporating embodiments of the electric axle assembly 100 disclosed herein are capable of including a number of Other powertrain components, such as, but not limited to, high-voltage battery pack with a battery management system or ultracapacitor, on-board charger, DC-DC converters, a variety of sensors, actuators, and controllers, among others.

Those of skill will recognize that the various illustrative logical blocks, modules, circuits, and algorithm steps described in connection with the embodiments disclosed herein, including with reference to the controller or control system described herein, for example, may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the preferred embodiments.

For example, various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Software associated with such modules may reside in RAM memory, flash memory, ROM memory, EPROM memory, EEPROM memory, registers, a hard disk, a removable disk, a CD-ROM, or any other suitable form of storage medium known in the art. An exemplary storage medium is coupled to the processor such that the processor reads information from, and write information to, the storage medium. In the alternative, the storage medium may be integral to the processor. The processor and the storage medium may reside in an ASIC. For example, in one embodiment, a controller for use of control of the axle includes a processor (not shown).

In accordance with the provisions of the patent statutes, the present invention has been described in what is considered to represent its preferred embodiments, however, it should be noted that the invention can be practiced otherwise than as specifically illustrated and described without departing from its scope or spirit. It should be noted that the description above has provided dimensions for certain components or subassemblies. The mentioned dimensions, or ranges of dimensions, are provided in order to comply as best as possible with certain legal requirements, such as best mode. However, the scope of the inventions described herein are to be determined solely by the language of the claims, and consequently, none of the mentioned dimensions is to be considered limiting on the inventive embodiments, except in so far as any one claim makes a specified dimension, or range of thereof, a feature of the claim.

While preferred embodiments have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments described herein may be employed in practicing the invention. It is intended that the following claims define the scope of the invention and that methods and structures within the scope of these claims and their equivalents be covered thereby.

The invention claimed is:

1. An electric axle, comprising:
a first motor-generator assembly including a first motor-generator and first gear carrier portion;
a second motor-generator assembly including a second motor-generator and a second gear carrier portion;
an axle housing including:
a first axle tube portion and a second axle tube portion arranged on opposite lateral sides of a center portion; and
an opening extending longitudinally through the center portion of the axle housing;
a first axle shaft drivingly connected the first motor-generator assembly and a left drive wheel; and
a second axle shaft drivingly connected to the second motor-generator assembly a second right wheel;
wherein the first motor-generator assembly is coupled to a first longitudinal side of the center portion of the axle housing and the second motor-generator is coupled to a second longitudinal side of the of the center portion of the axle housing that is opposite the first longitudinal side.

2. The electric axle of claim 1, further comprising a controller designed to:
generate a vehicle yaw moment via an adjustment of a torque and speed of each of the first and second motor-generators.

3. The electric axle of claim 1, further comprising a controller designed to:
determine if a low friction traction event demands left to right wheel torque or speed adjustment; and
send a left and right drive wheel torque or speed adjustment command to the first and second motor-generators.

4. The electric axle of claim 1, wherein:
the first motor-generator assembly further comprises a first motor-generator output gear and a first drive gear, and wherein the second motor-generator assembly further comprises a second motor-generator output gear and a second drive gear; and
the first motor-generator output gear is laterally offset from the second motor-generator output gear.

5. The electric axle of claim 4, wherein the first drive gear is laterally offset from the second drive gear.

6. The electric axle of claim 4, wherein the first and second motor-generator output gears and the first and second drive gears are spiral bevel gears.

7. The electric axle of claim 4, wherein the first motor-generator output gear and the first drive gear form a gear reduction.

8. The electric axle of claim 4, wherein the first and second motor-generator output gears are perpendicular to the first and second drive gears, respectively.

9. The electric axle of claim 1, wherein first and second motor-generator assemblies are positioned perpendicular to the first axle shaft and the second axle shaft, respectively.

10. The electric axle of claim 1, further comprising a first suspension mounting member and a second suspension mounting member coupled to an upper side of the axle housing.

11. The electric axle of claim 10, further comprising a first and second brake mounting member coupled to the axle housing outboard of the first suspension mounting member.

12. The electric axle of claim 1, wherein the first and second motor-generators are integral with the first and second gear carrier portions.

13. The electric axle of claim 1, wherein a rotor of the first motor-generator assembly and a rotor the second motor-generator assembly are coaxial.

14. The electric axle of claim 1, wherein the center portion of the axle housing includes circumferential faces with a plurality of apertures.

15. An electric axle assembly, comprising:
a first motor-generator assembly including a first motor-generator and first gear carrier portion;
a second motor-generator assembly including a first motor-generator and second gear carrier portion;
an axle housing including:
a first axle tube portion and a second axle tube portion arranged on opposite lateral sides of a center portion; and
an opening extending longitudinally through the center portion of the axle housing;
a first axle shaft drivingly connected the first motor-generator assembly and a left drive wheel; and
a second axle shaft drivingly connected to the second motor-generator assembly a right drive wheel;
wherein the first motor-generator assembly and the second motor-generator assembly extend longitudinally away from the center portion in opposite directions; and
wherein the first and second motor-generator assemblies are coaxial.

16. The electric axle assembly of claim 15, wherein the center portion includes two opposing circumferential portions with a plurality of apertures and the electric axle assembly further comprises a plurality of threaded fasteners coupling the first and second gear carrier portions to the two opposing circumferential portions, respectively.

17. The electric axle assembly of claim 15, further comprising a controller designed to:
send control commands to the first and second motor-generators to apply a vehicle yaw moment via an adjustment of a torque and speed of each of the first and second motor-generators.

18. The electric axle assembly of claim 15, further comprising a controller designed to:
send torque vectoring traction control commands to the first and second motor-generators.

19. The electric axle assembly of claim 15, further comprising a controller designed to:
monitor left and right drive wheel speed and torque;
determine if a low friction traction event demands left to right wheel torque or speed adjustment based on the monitored wheel speed and torque; and
send a left to right wheel torque or speed adjustment command to the first and second motor-generators.

* * * * *